Figure 1:
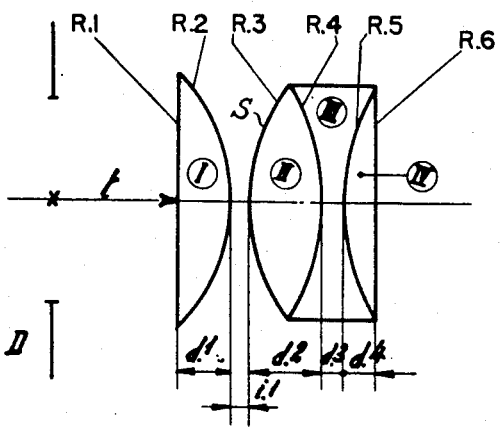

Oct. 31, 1950   J. COJAN   2,528,468
OCULAR LENS SYSTEM
Filed Jan. 16, 1950

INVENTOR:
JEAN COJAN.
Attorney.

Patented Oct. 31, 1950

2,528,468

UNITED STATES PATENT OFFICE 2,528,468

OCULAR LENS SYSTEM

Jean Cojan, Bourg-La-Reine, France

Application January 16, 1950, Serial No. 138,918
In France November 24, 1948

3 Claims. (Cl. 88—57)

This invention relates to improvements in oculars, and more particularly to convergent oculars having a large field angle, whereby distortion and astigmatic defects in such optical systems are eliminated or greatly reduced.

Oculars having a large apparent field angle in the order of 64° such as those used for instance in prism binoculars, usually comprise at least three groups or sets of separate lenses which may be simple lenses or multiple units each composed of two or three conjoined elements, and all the surfaces of such lenses are spherical in form.

If it were attempted to reduce the number of lenses used, the degree of curvature of the surfaces would become excessively great because of the large field angle that is required; the incidence angles of the light rays on the surface would be high and the resulting images would be very poor, both because of excessive distortion and very inadequate correction of astigmatism.

In the large-field oculars such aberrations of geometric origin are generally corrected chiefly by the divergent action exerted by the interfaces of the constituent elements of the multiple lens units in the ocular.

Thus, each of the convergent elements of said lenses is usually made from a type of glass having a lower refractive index than the type or types of glass from which the divergent elements associated therewith are made.

Other factors also play a part in the obtaining of acceptable optical correction conditions, one such factor being for instance the reduction of the higher degrees of curvature of the outer surfaces of the composite lens units.

However correction of distortion and of astigmatic defects remains a difficult problem and the residual defects are narrowly interrelated. Thus, where the distortion of the ocular is reduced, astigmatism becomes high, and conversely the presence of high distortion implies high field curvature.

In some known types of large field ocular arrangements, including lenses of spherical form, it has been found possible to reduce such astigmatic defects by introducing juxtaposed elements in which the refractive index of the glass used for the converging element is higher than those of the divergent elements associated therewith. Such an arrangement is particularly advantageous where applied to lenses located in use close to the observer's eye. The action exerted by the interfaces then becomes convergent rather than divergent as previously described. Such action, if it occurred alone, would tend to increase distortion, but it offers the advantage of reducing the Petzval total thereby resulting in lower astigmatism for a given field curvature.

It is true that to some extent such increase in distortion is attenuated due to the reduction in the curvatures of the more highly-curved outer surfaces of the composite lens units. Nevertheless with the exclusive use of spherical surfaces, the above-mentioned interdependancy between distortion correction and astigmatic correction subsists, even though it may be slightly lessened in such cases where the types of glass used for the convergent elements have higher refractive indexes than in the divergent elements associated therewith.

Achromatic oculars are also known, which are designed to magnify the image provided by an objective lens, and in which such interdependancy between distortion and astigmatism is practically eliminated. This result is obtained by imparting to one or more of the lens surfaces in the ocular a non-spherical shape, the departure from the osculatory spherical surface at the apex of the lens being so predetermined that the incidence and refraction angles are greatly reduced. Distortion is thus practically compensated for and this result is obtained substantially independently from any astigmatism corrections.

With such a device it is possible with the mere use of two sets of separate lenses to construct oculars having an apparent field in the order of 80°.

However, such systems comprising one or more non-spherical surfaces have only been made from conjoined elements wherein the indexes of the glass used for the convergent elements are always lower than those of the associated divergent elements. Consequently, the Petzval total, which it is essential to reduce in order to reduce the astigmatic defects in the image, is substantially unaltered, and the astigmatic defects in the marginal areas of the field, in particular, retain unacceptably high values.

It is an object of this invention to eliminate simultaneously all of the above-enumerated drawbacks and with this object in view the invention essentially consists of combining, in the construction of an ocular, both the means mentioned above, viz., imparting to one or more lenses non-spherical surfaces and at the same time forming convergent elements with grades of glass having higher indexes than the associated divergent elements.

While it is true that the convergent actions of the interfaces slightly increase distortion, the degree of correction introduced by the one or more nonspherical surfaces is such that the residual defects is practically negligible.

On the other hand, the use of such lens combinations makes it possible to reduce to a considerable extent the Petzval total and to obtain a greatly improved astigmatic correction in the resulting images over that obtainable with the use of combinations in which the convergent elements have indexes lower than the associated divergent elements.

Astigmatism reduction for a given field curvature may reach a proportion as high as 50% in the marginal areas of the field, with respect to that obtained in previously-known systems.

It will thus be seen that the new combination of the invention provides a substantial advance over the prior art, the technical advantages secured greatly exceeding the sum total of the advantages secured individually through the use of each of the means when applied separately.

The particular conditions in which the invention is embodied may be varied depending on the angular extent of the field required, and in each instance the most appropriate results may be obtained. Thus, it may not always be necessary to impart to all of the convergent elements an index greater than the divergent elements associated therewith. It may be simply necessary to provide one of the lenses in conformity with the teaching of the invention. In this way various combinations may be provided, part of the lenses being constructed in accordance with the invention while the remaining ones may be formed in any suitable conventional manner.

In any case however it is preferable to employ an arrangement according to which the convergent elements have a higher refractive index than the divergent elements in connection with that lens or those lenses which exert the greatest influence over astigmatism. In combinations of this sort, the convergent element of the dual lens may have an index lower or higher than that of the divergent element associated with it.

In a three-lens unit, comprising two convergent and one divergent element for instance, the indexes of both convergent elements may be higher or lower than the index of the divergent element; a mixed combination can also be used, one of the convergent elements having an index lower and the other an index higher than the divergent element.

As a limiting case, equality of the refractive indexes may be provided for a predetermined average frequency; in such case the interface or contact surface effect will not enter into the calculations of the aberration for the average radiation, and acts mainly upon the achromatism of the ocular.

The ensuing tabulations and accompanying drawings will illustrate by way of example some embodiments of oculars constructed according to the teachings of the invention as outlined above. The illustrative oculars selected comprise two sets of separate lenses and have a minimum apparent field angle of about 80°. It will be understood however that the invention is equally applicable to oculars composed of two or more sets or groups of separate lenses.

Figure 2:
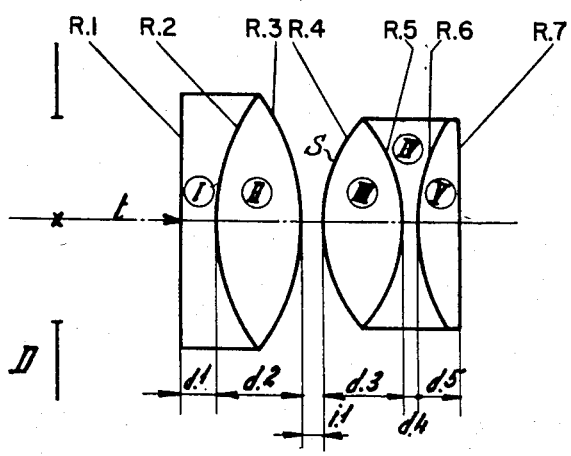
Figure 3:
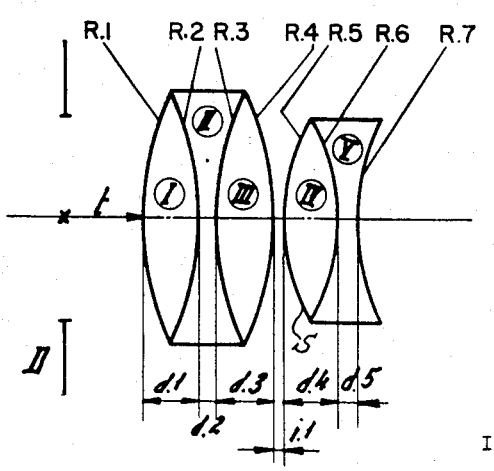

The drawings consist of Figures 1, 2 and 3, showing schematic axial sections of three representative embodiments of the invention.

The geometric magnitudes given refer to a focal distance of 100 units length: each type of glass is characterised by its index $n_D$ for the sodium line and by the reciprocal value $\nu$ of its dispersive capacity; $R_1 R_2 \ldots$ represent the radii of curvature of the successive lens surfaces, $d_1 d_2 \ldots$ the axial thicknesses of the respective component lenses, and $i_1$ the axial air separation between the field and eye lens groups. The numerals I, II, III, IV and V indicate the respective lens elements.

EXAMPLE I

Fig. 1 of the drawings shows in section an achromatic ocular for a prism refracting-telescope constructed in accordance with the invention. The factors indicated in the figure have the following values:

$R_1 = \infty$
$d_1 = 30.4$
$R_2 = -178.8$
$i_1 = 1.5$
$R_3 = +98.6$
$d_2 = 50.7$
$R_4 = -202.7$
$d_3 = 6.6$
$R_5 = +101.3$
$d_4 = 30.4$
$R_6 = \infty$ The diaphragm D is located at a distance $t = 77.9$ from the front face of the field lens.

The front face S of the rear element is of nonspherical form; in the example shown, a parabolic shape would be most appropriate; the radius of curvature of the osculatory sphere at the apex is 98.6.

*Characteristics of glass used*

| I | II | III | IV |
|---|---|---|---|
| $n_D = 1.56024$ | 1.65100 | 1.64770 | 1.69100 |
| $\nu = 60.9$ | 58.6 | 33.8 | 54.8 |

EXAMPLE 2 (FIG. 2)

$R_1 = \infty$
$d_1 = 9.1$
$R_2 = +240.6$
$d_2 = 51.7$
$R_3 = -240.6$
$i_1 = 0.6$
$R_4 = +90.2$
$d_3 = 66.9$
$R_5 = -158.1$
$d_4 = 9.1$
$R_6 = +158.1$
$d_5 = 21.3$
$R_7 = \infty$ The field diaphragm D is at a distance $t = 62.1$ from the foremost face of the lens. The front face S of the rear lens is nonspheric, e. g.; parabolical, the radius of curvature of the osculatory sphere at its apex being 90.2.

The rear face of the front lens (field lens) may also have a nonspherical (e. g. parabolical) form, if it is desired to obtain a very thorough correction of distortion: the radius of curvature of the osculatory sphere at its apex is 240.6.

*Characteristics of glass used*

| I | II | III | IV | V |
|---|---|---|---|---|
| $n_D = 1.65100$ | 1.65100 | 1.65100 | 1.62700 | 1.62700 |
| $\nu = 53.7$ | 58.6 | 58.6 | 35.4 | 54.5 |

It will be observed that this example shows a limiting case where the index $n_1 = n_2$ and $n_4 = n_5$.

EXAMPLE III

The ocular is shown in section in Fig. 3. Herein, $R_1 = 238.2$
$d_1 = 50.9$
$R_2 = -172.6$
$d_2 = 11.2$
$R_3 = 172.6$
$d_3 = 53.8$
$R_4 = -207.7$
$i_1 = 0.6$
$R_5 = 80.4$
$d_4 = 62.2$
$R_6 = -162.4$
$d_5 = 11.3$
$R_7 = 349.9$ The field diaphragm D is spaced a distance $t=35.1$ from the front face of the first lens. The front face S of the rear lens is nonspherical in form, e. g. parabolical. The radius of the osculatory sphere at its apex is 80.4.

*Characteristics of glass used*

| I | II | III | IV | V |
|---|---|---|---|---|
| $n_D = 1.58830$ | 1.72748 | 1.58830 | 1.64036 | 1.56841 |
| $\nu = 60.2$ | 28.5 | 60.2 | 57.6 | 42.6 |

What I claim is:

1. An ocular comprising two air-separated components coaxially disposed field and eye lens groups, one of the components being a triplet, at least the front surface of the front lens member of the eye lens group being parabolical, and having substantially the numerical data set forth in the following table wherein $R_1 R_2 \ldots$ designate the radius of curvature of successive lens surfaces, $d_1 d_2 \ldots$, the axial thickness of the lenses and the magnitudes referring to a focal distance of 100 units length, said field and eye lens groups having an axial air separation from each other of 1.5 units.

|  | Radius | Thickness of Lenses | Refractive Index ($n_D$) | Value V |
|---|---|---|---|---|
| Field Lens | $R_1 =$ infinity | | | |
|  | $R_2 = -178.8$ | $d_1 = 30.4$ | 1.56024 | 60.9 |
| Eye Lens Group | $R_3 = +98.6$ | | | |
|  | $R_4 = -202.7$ | $d_2 = 50.7$ | 1.65100 | 58.6 |
|  | $R_5 = +101.3$ | $d_3 = 6.6$ | 1.64770 | 33.8 |
|  | $R_6 =$ infinity | $d_4 = 30.4$ | 1.69100 | 54.8 |

2. An ocular comprising two air-separated components coaxially disposed field and eye lens groups, one of the components being a triplet, at least the front surface of the front lens member of the eye lens group and the rear surface of the rear lens member of the field group being parabolical, and having substantially the numerical data set forth in the following table wherein $R_1 R_2 \ldots$ designate the radius of curvature of successive lens surfaces, $d_1 d_2 \ldots$, the axial thickness of the lenses and the magnitudes referring to a focal distance of 100 units length, said field and eye lens groups having an axial air separation from each other of 0.6 unit.

|  | Radius | Thickness of Lenses | Refractive Index ($n_D$) | Value V |
|---|---|---|---|---|
| Field Group | $R_1 =$ infinity | | | |
|  | $R_2 = +240.6$ | $d_1 = 9.1$ | 1.65100 | 53.7 |
|  | $R_3 = -240.6$ | $d_2 = 51.7$ | 1.65100 | 58.6 |
| Eye Lens Group | $R_4 = +90.2$ | | | |
|  | $R_5 = -158.1$ | $d_3 = 66.9$ | 1.65100 | 58.6 |
|  | $R_6 = +158.1$ | $d_4 = 9.1$ | 1.62700 | 35.4 |
|  | $R_7 =$ infinity | $d_5 = 21.3$ | 1.62700 | 54.5 |

3. An ocular comprising two air-separated component coaxially disposed field and eye lens groups, one of the components being a triplet, at least the front surface of the front lens member of the eye lens group being parabolical, and having substantially the numerical data set forth in the following table wherein $R_1 R_2 \ldots$ designate the radius of curvature of successive lens surfaces, $d_1 d_2 \ldots$, the axial thickness of the lenses and the magnitudes referring to a focal distance of 100 units length, said field and eye lens groups having an axial air separation from each other of 0.6 unit.

|  | Radius | Thickness of Lenses | Refractive Index ($n_D$) | Value V |
|---|---|---|---|---|
| Field Group | $R_1 = +238.2$ | | | |
|  | $R_2 = -172.6$ | $d_1 = 50.9$ | 1.58830 | 60.2 |
|  | $R_3 = +172.6$ | $d_2 = 11.2$ | 1.72748 | 28.5 |
|  | $R_4 = -207.7$ | $d_3 = 53.8$ | 1.58830 | 60.2 |
| Eye Lens Group | $R_5 = +80.4$ | | | |
|  | $R_6 = -162.4$ | $d_4 = 62.2$ | 1.64036 | 57.6 |
|  | $R_7 = +349.9$ | $d_5 = 11.3$ | 1.56841 | 42.6 |

JEAN COJAN.

REFERENCES CITED

The following references are of record in the file of this patent:

UNITED STATES PATENTS

| Number | Name | Date |
|---|---|---|
| 873,870 | Konig | Dec. 17, 1907 |
| 934,579 | Straubel et al. | Sept. 21, 1909 |
| 1,159,233 | Konig | Nov. 2, 1915 |
| 1,968,222 | Richter | July 31, 1934 |
| 2,217,281 | Konig | Oct. 8, 1940 |
| 2,267,832 | McCarthy | Dec. 30, 1941 |

FOREIGN PATENTS

| Number | Country | Date |
|---|---|---|
| 530,506 | Great Britain | Dec. 13, 1940 |